2,845,363
METHOD OF MAKING STABLE CACTUS MUCILAGE

Gregoire Gutzeit, Highland, Ind., assignor to General American Transportation Corporation, Chicago, Ill., a corporation of New York No Drawing. Application August 11, 1953
Serial No. 373,665

2 Claims. (Cl. 106—205)

It is a main object of the invention to provide a process of making a stable coagulating reagent formed from the active mucilage in cactus juice at low cost.

Clarification of mineral suspensions containing solids such as phosphatic slimes, clays, magnesium hydroxide, and the like, can be expedited by the addition of a small amount of certain reagents to the suspension. The reagent induces flocculation of the minerals suspended in the liquid and the curds so formed settle rapidly, leaving the overflow clear.

There are a number of reagents that have been found to be satisfactory for this purpose; however, one of these reagents which produces flocculation in a most satisfactory manner has been found to be unstable because it will soon ferment and as a result, if the reagent is prepared but a few hours before it is used, it will have lost a great deal of its potency to produce flocculation and as a result its usefulness is greatly impaired. This reagent is a freshly prepared aqueous pulp of cactus stems and leaves.

Cactaceae leaves and stems from cacti, such as the prickly pear or Opuntia, Ectinocactus, Cereus and Echinocereus, contain juices rich in active mucilage, but heretofore such juices have not been separated from the pulp to form the reagent.

According to Webster's New International Dictionary (Second Edition, Unabridged, G. & C. Merriam Company, Springfield, Mass., 1947) mucilages are, chemically, "mixtures from which have been isolated complex carbohydrates, as araban, and related compounds, as alginic acid." Mucilages from cacti are particularly rich in alginic acid and derivatives.

The present invention relates to the method of extracting a stable mucilage in dry form from cactus juices and to the mucilage so produced. In carrying out the teachings of the invention, several methods can be used, but the principles involved are in every case idendical, the modifications having only the purpose of simplification or of facilitating unit operations.

The basic pattern of producing the powder consists in:

(a) Producing a pulp of cactus "leaves" and stems;
(b) Macerating the pulp in water, preferably at elevated temperature, to prepare an aqueous extract of the water-soluble, active agents or mucilage;
(c) Separating mechanically the fibrous solids from the aqueous extract by screening, filtering, centrifuging, pressing, etc.
(d) Treating the liquor with activated carbon in order to remove impurities by selective adsorption;
(e) Filtering, preferably with the addition of filter-aid;
(f) Precipitating the active agent or mucilage by addition of a water soluble aliphatic alcohol in amount from one to three volumes;
(g) Filtering the precipitated mucilage, and washing with alcohol;
(h) Drying the mucilage precipitate at low temperature;
(i) Reducing the dry precipitate to a powder; and
(j) Recovering the alcohol by distillation.

Steps (d) and (e) can be omitted if a cheaper unrefined product with lower flocculating efficiency is desired.

The following are examples of the process outlined above:

Example 1

Leaves and stems of Texas cactus were ground to pulp consistency and then mixed with cold water in the ratio of one pound of solids to three gallons of water. The mixture was then heated to boiling at atmospheric pressure and macerated for two hours at elevated temperature (about 180–200° F.).

The solids, in the form of fibrous material, were then separated from the bulk of liquor by straining, then by pressing in a preheated screw press, and the total obtained liquor was concentrated by evaporating to about one-tenth its original volume.

The concentrate thus obtained was clarified by filtering through an activated carbon filter to remove therefrom any suspended solids that may be still therein contained.

The thus clarified concentrate was mixed with two volumes of a water soluble aliphatic alcohol which causes precipitation of the active mucilage from the liquor. A number of water soluble aliphatic alcohols have been found to be satisfactory for use in this step of the process, including methyl alcohol, ethyl alcohol, isopropyl alcohol, and butyl alcohol.

The precipitates were separated by filtration from the liquid and dried at low temperature to a maximum of 5% moisture to form the base material from which the reagent is made. The dry precipitates are reduced to a powder which has good keeping qualities and can be kept indefinitely until required for use, as will be subsequently explained.

Example 2

41 pounds of Florida cactus were ground to pulp and 49 pounds of water added. The mixture was heated by means of live steam and digested for about two hours. It was then expressed in a preheated screw press, yielding 63 pounds of a viscous and turbid effluent containing 94.6% moisture. The press cake, consisting of fibrous material, felt dry although slippery, and contained 83.1% moisture.

One-half of the press juice was directly treated with less than two volumes of denatured ethyl alcohol to precipitate the active ingredients. The curds were drained on a fine screen, washed with alcohol and dried at low temperature. Grinding of this precipitate resulted in an "unrefined" powdered cactus extract which had good keeping qualities.

The other half of the press juice, after addition of .1% of sodium benzoate, was treated with .5% of activated carbon of the type commercially known by the trade name "Norit," and filtered, using a diatomaceous earth, commercially known as "Dicalite," as a filter-aid. Methyl alcohol was added to precipitate the mucilage, which was drained, washed, dried and ground as above, this time to form a "refined" powder.

Example 3

7 pounds of prickly pear cactus joints, consisting of leaves and stems, from the "Ogden Dunes" near Gary, Indiana, were ground in an "Enterprise" grinder. The green, slimy mush thus obtained was mixed with 10 gallons of water and live steam was passed into the mixture until it had boiled 10 minutes. Condensation added two additional gallons of water. The solids where then separated on a 20-mesh screen, and the liquid evaporated in an open kettle to about one-tenth of its original volume.

Activated carbon (Norit) was then added to this liquid in the ratio of 10 grams per pound of original wet solids. 15 grams of "speed plus" Dicalite was also mixed into the liquor as a filter-aid. Filtration was done under vacuum.

The clear, light green filtrate, 6000 cc. in amount, was mixed with 18 liters of denatured ethyl alcohol in order to precipitate the active agent. The low recovery is here due to the fact that simple screening drainage gives a very poor extraction. Pressing is recommended. A large, white, curdy precipitate settled to the bottom. The supernatant liquor was cloudy, even after filtering. One liter of isopropyl alcohol was added to coagulate the residual mucilage and complete the precipitation. After filtering, the curd was dried in a vacuum oven at 85° C. After grinding, the yield was 73.5 grams of fine powder.

In each of the above examples, the filtrates were collected and distilled for recovery of the alcohol.

The process of the present invention results in the extraction of the active mucilage ingredients in cactus juices and, after drying and pulverizing the extract keeps indefinitely without deterioration. This renders available an active cactus mucilage which can be used to form a flocculating reagent and can also be put to other uses where a vegetable mucilage is advantageous. The extract is produced at low cost which, of course, is desirable.

To prepare a flocculating reagent solution from the dry mucilage thus obtained from any of the processes above outlined, a small amount of cold water is added to the powder and the mixture allowed to stand for a few minutes until a gel is formed. After the soak has been completed, sufficient water is added to form the flocculating solution which contains from 1% to 2% of mucilage, and from 98% to 99% of water. The reagent thus formed, while not as stable as the dry powder, nevertheless is more stable than reagents of this kind made heretofore and can be kept for several days without an appreciable loss of potency. When this solution in amounts up to .3% is added to a suspension, flocculation of large curds occurs rapidly and a clear overflow is produced.

Having thus complied with the statutes and shown and described a preferred embodiment of my invention, what I consider new and desired to have protected by Letters Patent is pointed out in the appended claims.

I claim:

1. The method of forming a stable reagent to flocculate mineral suspensions by adding an amount of said reagent up to 0.3% of the solids in said suspensions, which comprises: grinding up cactus leaves and stems; mixing the ground vegetable matter with boiling water in the ratio of two pounds solids to from three to four gallons boiling water; boiling the mixture at atmospheric pressure to macerate the vegetable matter; separating the solids from the liquor; concentrating the liquor ten to twenty times by evaporation; filtering the concentrate through activated carbon to remove suspended solids; precipitating the filtered concentrate in from two to three volumes of water soluble aliphatic alcohols from the group consisting of methyl, ethyl, isopropyl and butyl alcohol; separating the precipitate from the liquid; drying and powdering the precipitate; soaking the active mucilage so formed in a small amount of cold water; and adding sufficient water to form a solution of 1% to 2% mucilage.

2. The method of forming a stable reagent to flocculate mineral suspensions by adding an amount of said reagent up to 0.3% of the solids in said suspensions, which comprises: grinding up cactus leaves and stems; adding the ground vegtable matter to boiling water in the ratio of two pounds of vegetable matter to four gallons of water; steeping the mixture to macerate the vegetable matter; separating the pulp from the liquor; concentrating the liquor from ten to twenty times; mixing the concentrated liquor with a filter-aid and filtering to remove suspended solids; precipitating the filtrate with from two to three volumes of water soluble aliphatic alcohols from the group consisting of methyl, ethyl, isopropyl and butyl alcohol; filtering and drying the precipitate; powdering the dry precipitate; soaping the powder in a small amount of cold water; and adding sufficient water to the soaked powder to form a solution containing from 1% to 2% powder and 98% to 99% water.

References Cited in the file of this patent

UNITED STATES PATENTS

| | | |
|---|---|---|
| 2,082,952 | Gruwell | June 8, 1937 |
| 2,132,577 | Olsen et al. | Oct. 11, 1938 |
| 2,144,522 | Braun | Jan. 17, 1939 |
| 2,301,787 | Nord | Nov. 10, 1942 |
| 2,386,264 | Roberts | Oct. 9, 1945 |
| 2,662,893 | Kurth | Dec. 15, 1953 |

OTHER REFERENCES

Lloyd: "Am. Jour. of Botany" 6, 156–166, 1919.
Stewart: "Expt. Sta. Rec." 43, 226 (1919).